Patented Jan. 7, 1941

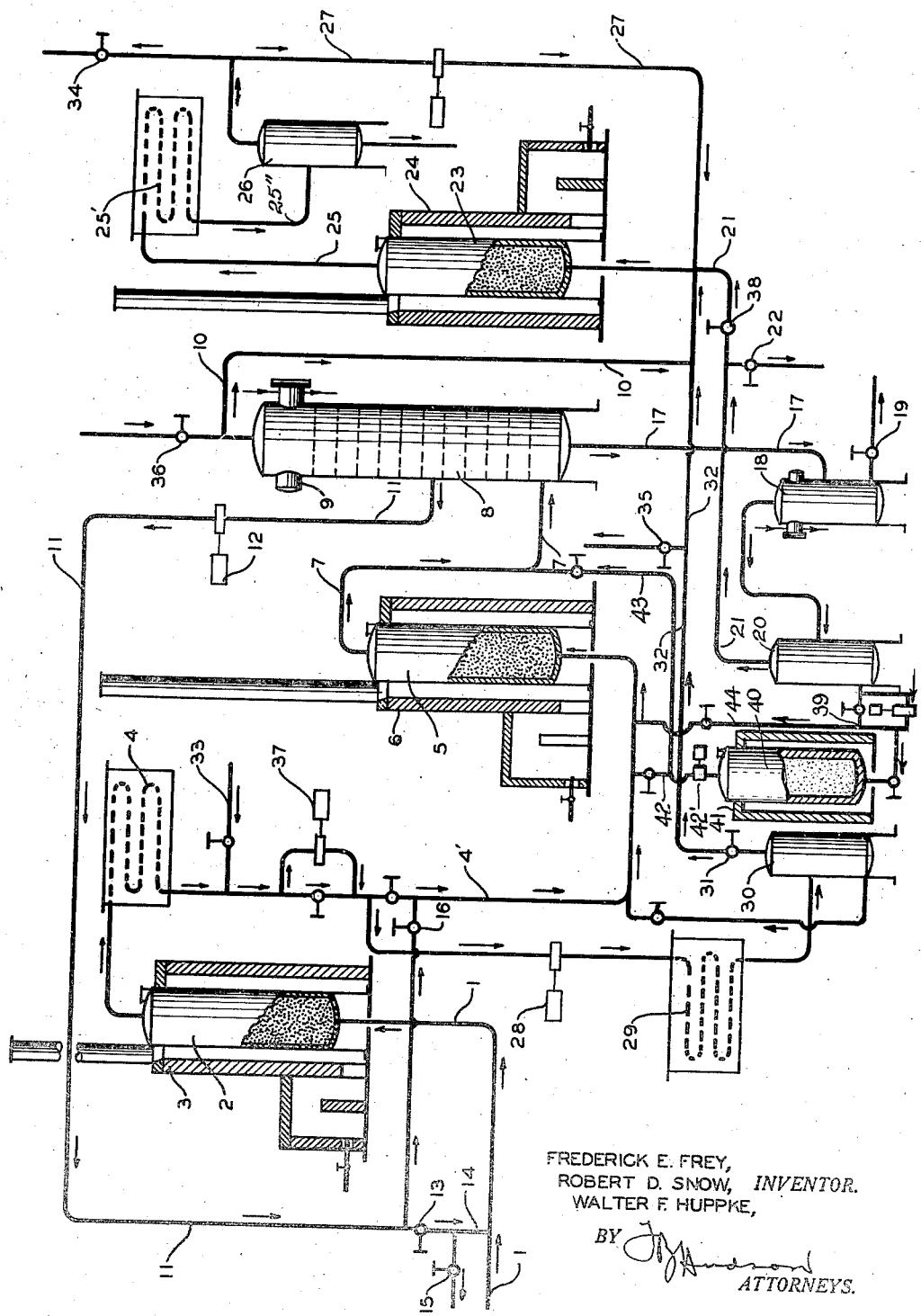

2,227,639

UNITED STATES PATENT OFFICE 2,227,639

PROCESS FOR CONVERTING HYDRO-
CARBONS

Frederick E. Frey, Robert D. Snow, and Walter F.
Huppke, Bartlesville, Okla., assignors to Phillips
Petroleum Company, Bartlesville, Okla., a corporation of Delaware Application September 24, 1934, Serial No. 745,348

21 Claims. (Cl. 196—10)

This invention relates to the conversion of simple paraffin hydrocarbons into volatile hydrocarbons of higher boiling point and more specifically to the conversion of simple paraffins into paraffins or olefins of higher molecular weight by two or more catalytic treatments.

Several methods have been proposed for efficiently converting the gaseous paraffins into hydrocarbons of higher boiling point in which the paraffins are in a first step converted into olefins by thermal dissociation and in a second step and under pressure the olefins thus formed are polymerized into hydrocarbons of higher molecular weight. The dissociation into olefins has been accomplished by heating the paraffins to a temperature of 500° C. or higher and at low pressures whereupon dissociation occurs and olefins are formed, for the most part by a splitting of the carbon to carbon bonds. The use of catalysts, effecting more or less dehydrogenation, has been proposed to assist in the formation of olefins. The polymerization of the olefins has been effected by compressing the olefin-containing gases and heating them under pressure to a polymerization temperature. In some cases catalysts have been proposed to facilitate such a polymerization.

We have found that by the use of a highly efficient catalyst in a first dehydrogenation step and an efficient polymerization catalyst in a second polymerization step, the use of greatly elevated pressures can be avoided and an efficient conversion of simple paraffins into higher boiling polymers obtained. Furthermore an intermediate compressing operation to obtain high pressure for polymerization may be avoided with the attendant need for cooling below the polymerization temperature before compressing, and heating afterward. Furthermore, when an efficient catalyst is used to effect the dehydrogenation, we obtain a quantity of elementary hydrogen substantially equal in volume to the olefin produced. The quantity of hydrogen is more than sufficient to effect hydrogenation of the polymeric products, which are predominantly olefins, to saturated hydrocarbons of the same distilling range. This hydrogenation we accomplish in a third catalytic step. Polymers of high molecular weight are usually formed, together with the polymers of low molecular weight, in the polymerizing operation and are generally of little value. However, where the formation of these high molecular weight polymers cannot be avoided, these higher polymers can be largely converted into polymers of lower molecular weight by contact with polymerization catalysts under conditions to be set forth.

The operation of our process will be understood from the following description and from the apparatus shown in the figure for carrying out the invention.

Paraffin hydrocarbons, predominating in hydrocarbons of not less than two nor more than five carbon atoms per molecule, are introduced continuously through the pipe 1 into the catalytic dehydrogenation chamber 2, the catalyst chamber being maintained at temperatures on the order of 400 to 600° C. by means of the heater 3. A pressure on the order of one to two atmospheres, or somewhat more or less, is suitable for conducting the dehydrogenation. The paraffin hydrocarbons are partially dehydrogenated in this step into their corresponding olefins and hydrogen. The effluents from the catalyst chamber 2 pass through the cooling coil 4, wherein a partial cooling takes place, and thence through conduit 4' to catalyst chamber 5 wherein polymerization of the olefins takes place at a temperature of 50 to 300° C., maintained by heating or cooling means 6, and at a pressure in the neighborhood of atmospheric or higher.

Catalyst chamber 5 contains a polymerization catalyst which effects a polymerization of the olefins present to normally liquid olefin hydrocarbons of higher molecular weight. The hydrocarbons, now containing the polymers, pass from 5 through conduit 7 to fractionating or separating tower 8 where cooling is effected by cooler 9 which liquefies the greater part of the hydrocarbons and returns them to the separating tower 8 while allowing hydrogen containing a limited proportion of hydrocarbon to pass into conduit 10. The unchanged propane, butane, pentanes or the like together with surviving olefins of corresponding molecular weight pass through conduit 11, pump 12, valve 13 and conduit 14 to conduit 1 where they may be returned to the dehydrogenation catalyst chamber 2 or a part may be discarded through valve 15 or returned in part through valve 16 to the polymerization catalyst chamber 5. The polymers formed in the process collect in the lower part of separating tower 8 and are withdrawn through conduit 17 to fractionator 18 wherein a desired proportion of the heavier polymers is separated from the mixture and is withdrawn through valve 19, while the remaining polymers pass to separator 20 wherein a partial condensation may take place and polymers of undesirably high molecular weight be condensed. This heavy polymer condensate is passed out of separator 20 through conduit 39 to catalyst chamber 40, wherein depolymerization takes place at a pressure less than that in polymerization chamber 5 and at 150–400° C., maintained by heating means 41. Effluents from chamber 40 are passed through conduit 42 and pump 42' into conduit 4' and chamber 5, or they may be passed into separator 8 by means of conduit 42 and 43 into conduit 7. If it is so desired, heavy polymers from separator 20 may be passed directly into conduit 4' and chamber 5 by means of conduit 44. Chamber 40 will operate at some pressure in the neighborhood of atmospheric or at least substantially below the polymerizing pressure of chamber 5, and compression of the effluents from separator 20 may not be necessary.

The polymers of intermediate molecular weight pass from separator 20 through conduit 21 to valve 22 where they may be withdrawn from the system or may go through valve 36 to hydrogenation catalyst chamber 23 maintained at reaction temperature by heater 24 where, in the presence of the hydrogen entering by conduit 10, a hydrogenation is effected. Hydrogenation may be effected at 100 to 400° C. and pressure of atmospheric or higher. The hydrogenated polymers and excess hydrogen pass through conduit 25 to the cooler 25' and from there they flow through conduit 25" to separator 26 wherein the hydrogenated polymer is separated from the hydrogen, a part of which hydrogen may be returned through conduit 27 to the hydrogenation catalyst chamber 23. In some cases, particularly when olefins of normal structure which do not polymerize readily are obtained by dehydrogenation, elevated pressures are desirable for the polymerization. In such cases the effluents from the dehydrogenation step may be withdrawn from conduit 4' compressed by compressor 28 and passed to polymerization catalyst chamber 5. Hydrogen may be separated prior to the polymerization step by condensing the compressed gases in cooler 29 and separating therefrom the hydrogen in separator 30 and passing it through valve 31 and conduit 32 to the hydrogenation catalyst chamber 23 or out of the system. In many cases however a high degree of compression may be avoided by the use of a compressor of the rotating impeller type 37 whereby the effluents from the cooler 4 may be increased several fold in pressure to assist in the polymerization without an intermediate cooling below polymerizing temperature. While separation of hydrogen prior to the polymerizing step is sometimes desirable, it is not necessary, as the polymerization may be conducted satisfactorily in its presence. However, it should, of course, be separated from any unchanged paraffin hydrocarbons to be recycled to the dehydrogenating catalyst chamber.

We have found, for the dehydrogenation step, catalysts of gel structure containing chromium oxide as the chief active ingredient and other oxides (such as those described in copending application Serial No. 723,608 which is now U. S. Patent 2,098,959) to be particularly effective in producing sufficient quantities of hydrogen to hydrogenate all the olefinic products, associated with only small quantities of the products of scission reactions. These catalysts are likewise effective for bringing about hydrogenation which constitutes the third reaction step of our process but other effective dehydrogenation or hydrogenation catalysts may also be used. Hydrous aluminum silicates, mixed alumina and silica gels, fuller's earth activated by treatment with a halogen acid and the like catalysts may be used for effecting the polymerization step in our process.

The process as described may be used to convert simple paraffins or their mixtures into higher boiling hydrocarbons. Methane cannot be converted, but the higher paraffins, preferably propane, butanes and pentanes are particularly suitable. When a single paraffin is treated, products of simpler composition are obtained. Isobutane, for example, yields diisobtylene and triisobutylene and, by hydrogenation, their corresponding saturated hydrocarbons. Mixtures of paraffins yield products of less simple composition.

Many variations in the apparatus can obviously be used. The clean character of the effluents and the absence of coking conditions allows of the efficient use of indirect heat exchange. Heat accordingly may be recovered from the effluents of the dehydrogenation step. The polymerization step is exothermic and heat may be extracted from the catalyst body and the effluents and returned to the hydrocarbons entering the polymerization catalyst. A second polymerizing conversion stage may be used to effect a conversion of olefins not converted in the first stage and in such a case the polymers resulting from the first stage operation are partly or wholly removed before treating the hydrocarbons in a second polymerization stage.

When polymerization is carried out at high pressures we have found that undesired high polymers cannot be returned to the catalytic polymerization to effect their conversion into lower polymers. In such a case they may be subjected to a separate treatment which consists in passing them in the vapor state and at pressures in the neighborhood of atmospheric or at least substantially below polymerizing pressure and at 150–400° C. through a bed of the catalyst used for polymerization, effecting under the stated conditions a depolymerization and thence to the inlet or the exit of the polymerization catalyst chamber 5 to effect polymerization of the simple olefins resulting from the depolymerization, or to recover the lower polymers formed by said depolymerization. By polymers of lower molecular weight is meant those containing 10 or less than 10 carbon atoms per molecule. Those of intermediate molecular weight containing 10 to 14 carbon atoms per molecule distill within the gasoline range and are in some cases a desired product. These polymers and those of somewhat higher molecular weight can be depolymerized in the manner shown, but very heavy polymers produced in small amount we have found to decrease catalyst activity and are best not returned to the depolymerization step.

Hydrocarbon materials containing olefins of low molecular weight suitable for polymerization may be added by inlet 33 to the hydrocarbons entering the polymerization catalyst chamber 5. Hydrogen produced by the dehydrogenation step may be withdrawn from the system through valves 34 or 35 for hydrogenation purposes or other uses, or hydrocarbons from an outside source, such as are produced by cracking or the like, may be introduced to the hydrogenation catalyst chamber 23 through valve 36.

Where only paraffin-olefin mixtures are available as charging stock for the process, such charge will preferably be introduced through the line 33, in which case the charge to the catalytic dehydrogenation chamber 2 will be substantially entirely a product of the later separating stages of the process. Such a charging stock may also be subjected to a separate polymerizing operation before subjecting it to the separating steps in the process if so desired.

*Example 1.*—Isobutane, prepared by fractional distillation from natural gasoline, was passed at atmospheric pressure and 475° C. over a granular catalyst consisting of chromium oxide, aluminum oxide and magnesium oxide in the molal ratio of 60:30:10. The effluents contained 22 per cent isobutylene, 21 per cent hydrogen, 2 per cent of cracking products, the remainder being unconverted isobutane. The effluents were cooled to 150° C. and passed through a polymerization catalyst consisting of acidic alumina gel containing a small proportion of silica. Reaction took place and the isobutylene was converted into polymers, 25 per cent of which boiled above 170° C. and consisted chiefly of the tri-polymer, the remainder being essentially diisobutylene. The effluents were passed, still at atmospheric pressure, through a second portion of the catalyst used for dehydrogenation while a hydrogenating temperature of 280° C. was maintained. Hydrogenation was virtually complete, 2,2,4-trimethyl pentane was the chief product, higher boiling saturates, chiefly dodecane, being also produced. A portion of the effluent from the polymerization stage was diverted and cooled. Diisobutylene and higher boiling hydrocarbons were obtained. The higher boiling hydrocarbons were evaporated except for a small amount of heavy polymer, and returned to the polymerization step. An increased yield of diisobutylene was obtained and the proportion of higher polymers reduced to less than 10 per cent of the total polymer yield.

*Example 2.*—A mixture of butanes and propane was dehydrogenated as shown in Example 1. The hydrocarbon products were liquefied and passed at 100 pounds per square inch pressure over the polymerization catalyst of Example 1 at 250° C. Polymers were separated amounting to 75 per cent of the butylene and propylene present. The polymers distilled to the extent of 85 per cent in the gasoline boiling range to give a product of 0.73 specific gravity and 81 octane number. A saturated product with the same distilling range was obtained by passing the product boiling in the gasoline range together with hydrogen obtained from dehydrogenation over the hydrogenation catalyst.

Having described our invention, what we claim is:

1. In a process for converting simple paraffins into saturated hydrocarbons of higher molecular weight, passing paraffins of not less than two nor more than five carbon atoms per molecule in a first reaction step into contact with a dehydrogenation catalyst while maintaining a reaction temperature and thereby producing olefins and hydrogen, passing said olefins in a second reaction step into contact with a polymerization catalyst while maintaining a reaction temperature and effecting polymerization of the olefins, then separating from the effluents of the second step the lower polymers and the higher polymers, passing the higher polymers in contact with a depolymerizing catalyst at a reaction temperature and low pressure thereby effecting depolymerization, separating from the effluents of the depolymerization step the simple olefins so produced and returning said olefins to the said second reaction step, and hydrogenating at least a portion of the lower polymers produced with hydrogen produced in the dehydrogenation step.

2. A process for producing motor fuel from a propane-butane mixture, which comprises dehydrogenating the mixture thereby forming free hydrogen and polymerizable olefins, subjecting the resultant products to polymerization to polymerize a substantial portion of the olefins into gasoline boiling hydrocarbons, separating the products of the last-named step into a hydrogen-containing gas, polymer liquid and an intermediate fraction comprising essentially 3 and 4 carbon atom hydrocarbons, returning at least a portion of said intermediate fraction to the process for retreatment, and saturating said polymer liquid with the hydrogen content of said gas.

3. A process for producing a predominantly paraffinic motor fuel from paraffin hydrocarbons of not less than two nor more than five carbon atoms per molecule, which comprises dehydrogenating a hydrocarbon mixture comprising essentially paraffin hydrocarbons of not less than two nor more than five carbon atoms per molecule thereby forming free hydrogen and polymerizable olefins, subjecting the resultant products to a catalytic polymerization to polymerize a substantial portion of the olefins into hydrocarbons in the motor fuel boiling range, separating the products of the last named step into a gas containing free hydrogen, a polymer liquid and an intermediate fraction comprising essentially hydrocarbons of not less than two nor more than five carbon atoms per molecule, returning at least a portion of said intermediate fraction to the process for retreatment, and saturating said polymer liquid with the hydrogen content of said gas.

4. A process for producing a predominantly paraffinic motor fuel from paraffin hydrocarbons of not less than two nor more than five carbon atoms per molecule, which comprises dehydrogenating a hydrocarbon mixture comprising essentially paraffin hydrocarbons of not less than two nor more than five carbon atoms per molecule thereby forming free hydrogen and polymerizable olefins, separating from the products of said dehydrogenation a gas containing free hydrogen and a fraction containing said polymerizable olefins, subjecting said polymerizable olefins to polymerization to polymerize a substantial portion thereof into hydrocarbons in the motor fuel boiling range, separating from the products of the last named step a polymer liquid in the motor fuel boiling range and a fraction comprising essentially hydrocarbons of not less than two nor more than five carbon atoms per molecule and returning at least a portion of said fraction to the process for retreatment, and saturating said polymer liquid with the hydrogen content of said gas.

5. A process for producing a predominantly paraffinic motor fuel from simple normally gaseous paraffins, which comprises dehydrogenating a propane-butane mixture thereby forming free hydrogen and polymerizable olefins, subjecting the resultant products to polymerization to polymerize a substantial portion of said olefins into gasoline boiling hydrocarbons, separating the products of the last named step into a gas containing hydrogen and hydrocarbons of less than three carbon atoms, a fraction containing three and four carbon atom hydrocarbons and recycling such separated three and four carbon atom hydrocarbons to the dehydrogenating step, and separating also gasoline boiling hydrocarbons and saturating said gasoline boiling hydrocarbons with the hydrogen content of said gas.

6. A process for producing a predominantly paraffinic motor fuel from low molecular weight paraffins, which comprises subjecting a hydrocarbon material, comprised predominantly of paraffin hydrocarbons having not less than two nor more than five carbon atoms per molecule, to a catalytic dehydrogenation at a low pressure and a temperature between about 400° and 600° C. thereby forming free hydrogen and olefin hydrocarbons having not less than two nor more than five carbon atoms per molecule, separating from the products of said dehydrogenation a gas containing free hydrogen and a fraction containing said olefins, subjecting said olefins to a catalytic polymerization at an elevated pressure and a temperature between about 50° and 300° C. to polymerize a substantial portion thereof into hydrocarbons in the motor fuel boiling range, separating from the products of the last named step a polymer liquid in the motor fuel boiling range and a fraction comprising essentially hydrocarbons of not less than two nor more than five carbon atoms per molecule and returning at least a portion of said fraction to the dehydrogenation step and saturating said polymer liquid with the hydrogen content of said gas.

7. In a process for the production of a predominantly paraffinic motor fuel from isobutane, the steps which comprise dehydrogenating a hydrocarbon material comprised predominantly of isobutane thereby forming free hydrogen and polymerizable olefins, subjecting the resultant products to polymerization to polymerize a substantial portion of the olefins into motor fuel boiling range hydrocarbons, separating the products of the last named step into a hydrogen-containing gas, a polymer liquid in the motor fuel boiling range and an intermediate fraction comprising essentially isobutane, returning at least a portion of said intermediate fraction to the process for retreatment, and saturating said polymer liquid with the hydrogen content of said gas.

8. A process for producing a paraffinic motor fuel comprising a predominant proportion of hydrogenated polymers of isobutylene, which comprises subjecting a hydrocarbon material comprised predominantly of isobutane to dehydrogenation at a dehydrogenation temperature above about 400° C. whereby free hydrogen and olefins comprising isobutylene are formed, separating from the effluent from said dehydrogenation a gas comprising free hydrogen and a fraction comprising said olefins, subjecting said fraction comprising olefins to the action of a polymerization catalyst at a temperature between about 50 and 300° C. and under an elevated pressure whereby polymers in the motor fuel boiling range are formed, separating from the effluent of said last named step a fraction comprising polymers in the motor fuel boiling range and a fraction comprising essentially isobutane and returning at least a portion of said latter fraction to the dehydrogenation step, and submitting said fraction comprising polymers in the motor fuel boiling range to a non-destructive hydrogenation in the presence of a hydrogenation catalyst and a sufficient portion of the free hydrogen from said dehydrogenation to saturate completely said polymer whereby a paraffinic motor fuel is produced.

9. A process for producing a predominantly paraffinic motor fuel from a propane-butane mixture, which comprises dehydrogenation a hydrocarbon material comprised essentially of propane and butane at a temperature between about 400° and 600° C. thereby forming free hydrogen and polymerizable olefins, separating from the products of said dehydrogenation a hydrogen-containing gas and a fraction containing said polymerizable olefins, subjecting said polymerizable olefins to a catalytic polymerization at a temperature between about 50° and 300° C. to polymerize a substantial portion thereof into hydrocarbons in the motor fuel boiling range, separating from the products of the last named step a polymer liquid in the motor fuel boiling range and a fraction comprising essentially three and four carbon atom hydrocarbons, returning at least a portion of said fraction to the process for retreatment, and saturating said polymer liquid with the hydrogen content of said gas.

10. A process for producing a predominantly paraffinic motor fuel from butanes, which comprises dehydrogenating a hydrocarbon material comprised essentially of butanes in the presence of a catalyst at a temperature between about 400° and 600° C. thereby forming free hydrogen and polymerizable olefins, separating from the products of said dehydrogenation a hydrogen-containing gas and a fraction containing said polymerizable olefins, subjecting said polymerizable olefins to a catalytic polymerization whereby a substantial portion thereof is polymerized into hydrocarbons in the motor fuel boiling range, separating from the products of the last named step a fraction comprising polymer liquid in the motor fuel boiling range and a fraction comprising essentially four carbon atom hydrocarbons, returning at least a portion of said fraction comprising four carbon atom hydrocarbons to the process for retreatment, and saturating said polymer liquid with the hydrogen content of said gas.

11. A process for producing motor fuel from a hydrocarbon mixture comprising essentially a mixture of paraffins and olefins having three and four carbon atoms per molecule, which comprises subjecting such a mixture, in admixture with the products of a subsequent dehydrogenation, to polymerization to polymerize a substantial portion of the olefins into gasoline boiling hydrocarbons, separating the products of this step into a hydrogen-containing gas, a polymer liquid and an intermediate fraction comprising essentially three and four carbon atom paraffin hydrocarbons, dehydrogenating at least a portion of said intermediate fraction thereby forming free hydrogen and olefins having three and four carbon atoms per molecule, mixing the resultant products with the aforesaid mixture charged to the process, and saturating said polymer liquid with the hydrogen content of said gas.

12. A process for the production of a paraffinic motor fuel from hydrocarbons of low molecular weight, which comprises subjecting a hydrocarbon material containing both paraffin and olefin hydrocarbons having not less than two nor more than five carbon atoms per molecule, in admixture with similar olefins produced in a subsequent dehydrogenation step, to a catalytic polymerization to polymerize a substantial portion of said olefin hydrocarbons into a polymer liquid in the motor fuel boiling range, separating the products of said polymerization into a polymer liquid in the motor fuel boiling range and a fraction comprising essentially paraffin hydrocarbons having not less than two nor more than five carbon atoms per molecule and dehydrogenating said fraction thereby forming free hydrogen and polymerizable olefins, separating from the products a hydrogen-containing gas and a fraction containing said polymerizable olefins and passing said fraction to the aforesaid polymerization step, and saturating the said polymer liquid in the motor fuel boiling range with the hydrogen content of said gas.

13. A process for producing a predominantly paraffinic motor fuel from paraffin hydrocarbons having a low molecular weight, which comprises dehydrogenating a hydrocarbon material comprising essentially paraffin hydrocarbons having not less than two nor more than five carbon atoms per molecule thereby forming free hydrogen and polymerizable olefins, separating from the products of said dehydrogenation a gas containing free hydrogen and a fraction containing said polymerizable olefins, subjecting said polymerizable olefins to a catalytic polymerization at an elevated pressure to polymerize a substantial portion thereof into higher molecular weight hydrocarbons some of which are in the gasoline boiling range, passing the effluent to a separation step and separating a fraction comprising hydrocarbons in the motor fuel boiling range and a second fraction comprising hydrocarbons boiling above the motor fuel boiling range, subjecting said second fraction to a depolymerization to form hydrocarbons having a lower molecular weight, passing the products to the aforesaid separating step, and saturating the said fraction containing hydrocarbons in the motor fuel boiling range with the hydrogen content of said gas.

14. A process for producing a paraffinic motor fuel comprising a predominant proportion of hydrogenated polymers of isobutylene, which comprises subjecting a hydrocarbon material comprised predominantly of isobutane to dehydrogenation at a dehydrogenation temperature above about 400° C. whereby free hydrogen and olefins comprising isobutylene are formed, separating from the effluent from said dehydrogenation a gas comprising free hydrogen and a fraction comprising said olefins, subjecting said fraction comprising olefins to the action of a polymerization catalyst consisting of mixed alumina and silica gel, at a temperature between about 50 and 300° C. and under an elevated pressure whereby polymers in the motor fuel boiling range are formed, separating from the effluent of said last named step a fraction comprising polymers in the motor fuel boiling range and a fraction comprising essentially isobutane and returning at least a portion of said latter fraction to the dehydrogenation step, and submitting said fraction comprising polymers in the motor fuel boiling range to a non-destructive hydrogenation in the presence of a hydrogenation catalyst and a sufficient portion of the free hydrogen from said dehydrogenation to saturate completely said polymer wherby a paraffinic motor fuel is produced.

15. A process for producing a predominantly paraffinic motor fuel from paraffin hydrocarbons having a low molecular weight, which comprises dehydrogenating a hydrocarbon material comprising essentially paraffin hydrocarbons having not less than two nor more than five carbon atoms per molecule thereby forming free hydrogen and polymerizable olefins, separating from the products of said dehydrogenation a gas containing free hydrogen and a fraction containing said polymerizable olefins, subjecting said polymerizable olefins to a catalytic polymerization in the presence of a catalyst consisting of mixed alumina and silica gel at an elevated pressure to polymerize a substantial portion thereof into higher molecular weight hydrocarbons some of which are in the gasoline boiling range, passing the effluent to a separation step and separating a fraction comprising hydrocarbons in the motor fuel boiling range and a second fraction comprising hydrocarbons boiling above the motor fuel boiling range, subjecting said second fraction to a depolymerization in the presence of a catalyst consisting of mixed alumina and silica gel to form hydrocarbons having a lower molecular weight, passing the products to the aforesaid separating step, and saturating the said fraction containing hydrocarbons in the motor fuel boiling range with the hydrogen content of said gas.

16. A process for producing a predominantly paraffinic motor fuel from paraffin hydrocarbons having a low molecular weight, which comprises dehydrogenating a hydrocarbon material comprising essentially paraffin hydrocarbons having not less than two nor more than five carbon atoms per molecule thereby forming free hydrogen and polymerizable olefins, separating from the products of said dehydrogenation a gas containing free hydrogen and a fraction containing said polymerizable olefins, subjecting said polymerizable olefins to a catalytic polymerization at an elevated pressure to polymerize a substantial portion thereof into higher molecular weight hydrocarbons some of which are in the gasoline boiling range, passing the effluent to a separation step and separating a fraction comprising hydrocarbons in the motor fuel boiling range and a second fraction comprising hydrocarbons boiling above the motor fuel boiling range, subjecting said second fraction to a depolymerization to form hydrocarbons having a lower molecular weight, returning the products of depolymerization to the system for further processing, and saturating the said fraction containing hydrocarbons in the motor fuel boiling range with the hydrogen content of said gas.

17. A process for producing a predominantly paraffinic motor fuel from paraffin hydrocarbons having a low molecular weight, which comprises dehydrogenating a hydrocarbon material comprising essentially paraffin hydrocarbons having not less than two nor more than five carbon atoms per molecule thereby forming free hydrogen and polymerizable olefins, separating from the products of said dehydrogenation a gas containing free hydrogen and a fraction containing said polymerizable olefins, subjecting said polymerizable olefins to a catalytic polymerization at an elevated pressure to polymerize a substantial portion thereof into higher molecular weight hydrocarbons some of which are in the gasoline boiling range, passing the effluent to a separation step and separating a fraction comprising hydrocarbons in the motor fuel boiling range and a second fraction comprising hydrocarbons boiling above the motor fuel boiling range, subjecting said second fraction to a depolymerization to form hydrocarbons having a lower molecular weight, passing the products to the aforesaid polymerization step, and saturating the said fraction containing hydrocarbons in the motor fuel boiling range with the hydrogen content of said gas.

18. A process for producing a predominantly paraffinic motor fuel from paraffin hydrocarbons having a low molecular weight, which comprises dehydrogenating a hydrocarbon material comprising essentially paraffin hydrocarbons having not less than two nor more than five carbon atoms per molecule thereby forming free hydrogen and polymerizable olefins, separating from the products of said dehydrogenation a gas containing free hydrogen and a fraction containing said polymerizable olefins, subjecting said polymerizable olefins to a catalytic polymerization at an elevated pressure to polymerize a substantial portion thereof into higher molecular weight hydrocarbons some of which are in the gasoline boiling range, passing the effluent to a separation step and separating a fraction comprising hydrocarbons in the motor fuel boiling range and a second fraction comprising hydrocarbons boiling above the motor fuel boiling range, subjecting said second fraction to a depolymerization in the presence of a catalyst comprising hydrous aluminum silicate to form hydrocarbons having a lower molecular weight, passing the products to the aforesaid separating step, and saturating the said fraction containing hydrocarbons in the motor fuel boiling range with the hydrogen content of said gas.

19. A process for producing a predominantly paraffinic motor fuel from paraffin hydrocarbons having a low molecular weight, which comprises dehydrogenating a hydrocarbon material comprising essentially paraffin hydrocarbons having not less than two nor more than five carbon atoms per molecule thereby forming free hydrogen and polymerizable olefins, separating from the products of said dehydrogenation a gas containing free hydrogen and a fraction containing said polymerizable olefins, subjecting said polymerizable olefins to a catalytic polymerization in the presence of a catalyst consisting of mixed alumina and silica gel at an elevated pressure to polymerize a substantial portion thereof into higher molecular weight hydrocarbons some of which are in the gasoline boiling range, passing the effluent to a separation step and separating a fraction comprising hydrocarbons in the motor fuel boiling range and a second fraction comprising hydrocarbons boiling above the motor fuel boiling range, subjecting said second fraction to a depolymerization in the presence of a catalyst comprising a hydrous aluminum silicate to form hydrocarbons having a lower molecular weight, passing the products to the aforesaid separating step, and saturating the said fraction containing hydrocarbons in the motor fuel boiling range with the hydrogen content of said gas.

20. In a process for converting simple paraffins into saturated hydrocarbons of higher molecular weight, passing paraffins of not less than two nor more than five carbon atoms per molecule in a first reaction step into contact with a dehydrogenation catalyst while maintaining a dehydrogenation temperature and pressure to produce olefins and hydrogen, separating from the products of said dehydrogenation a gas containing free hydrogen and a fraction containing said olefins, passing said olefins in a second reaction step into contact with a polymerization catalyst while maintaining a reaction temperature and effecting a polymerization of olefins, then separating from the effluents of the second step lower polymers and higher polymers, passing said higher polymers in contact with a depolymerizing catalyst at a reaction temperature and low pressure to effect depolymerization, separating from the effluents of the depolymerization step the simple olefins so produced and returning said olefins to the said second reaction step, and hydrogenating at least a portion of the lower polymers so produced with hydrogen produced in the dehydrogenation step.

21. In a process for converting simple paraffins into saturated hydrocarbons of higher molecular weight, passing paraffins of not less than two nor more than five carbon atoms per molecule in a first reaction step into contact with a dehydrogenation catalyst while maintaining a dehydrogenation temperature and pressure to produce olefins and hydrogen, passing the resultant products in a second reaction step into contact with a polymerization catalyst while maintaining a reaction temperature and effecting a polymerization of olefins, from the products of the last named step separating a gas containing free hydrogen, separating also lower polymers, and separating also higher polymers, passing said higher polymers in contact with a depolymerizing catalyst at a reaction temperature and low pressure to effect depolymerization, separating from the effluents of the depolymerization step the simple olefins so produced and returning said olefins to the second reaction step, and hydrogenating at least a portion of the lower polymers so produced with hydrogen produced in the dehydrogenation step.

FREDERICK E. FREY.
ROBERT D. SNOW.
WALTER F. HUPPKE.

CERTIFICATE OF CORRECTION.

Patent No. 2,227,639. January 7, 1941.

FREDERICK E. FREY, ET AL.

It is hereby certified that error appears in the printed specification of the above numbered patent requiring correction as follows: Page 4, second column, line 5, claim 9, for the word "dehydrogenation" read --dehydrogenating--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.